United States Patent Office 3,443,963
Patented May 13, 1969

3,443,963
PROCESS FOR FREEZING COFFEE EXTRACT
Herman R. Simon, Woodcliff Lake, N.J., and Stanley Barnett, Pearl River, N.Y., assignors to General Foods Corporation, White Plains, N.Y., a corporation of Delaware
No Drawing. Filed May 5, 1965, Ser. No. 453,471
Int. Cl. A23f 1/08; F26b 5/06
U.S. Cl. 99—71                                    8 Claims

ABSTRACT OF THE DISCLOSURE

Freeze-dried coffee having a dark color is produced by controlling the freezing rate of the extract within a critical temperature range depending on the concentration of the extract.

---

The invention relates to improving the color of freeze-dried coffee. More particularly, this invention concerns controlling the freezing rate of roasted coffee extract during a small portion of the freezing curve.

Generally, it is recognized that rapid freezing will promote the distribution of a large number of ice crystals of small size and that slow-freezing will produce a lesser number of ice crystals of larger size. Thus, in the dehydration of solid foods, such as meats, fruits, and vegetables, fast-freezing methods (from a fraction of a second to several minutes) have been used when it is desired not to disturb the cellular structure of the food and slow-freezing techniques (from 15 minutes to several hours) have been used when it is desired to expand the cellular walls of the food. By controlling the freezing rate, the texture and rehydration rate of the material to be dried can also be controlled.

While slow-freezing techniques have been used in regard to solid food materials in order to improve rehydration or improve the texture of the dried food material, slow-freezing of liquid food material has generally been considered undesirable. In the case of liquids, there is no cellular structure to expand and rehydration rates and texture are not improved by varying the freezing rate. Thus, in the case of coffee extract, this extract has been frozen and then freeze-dried under varying conditions. However, slow-freezing of coffee has never been suggested or tried as a means for improving either the drying process or the quality of the final product produced. Several patents disclose differing techniques for freeze-drying of coffee, but none of these patents indicate any advantage for varying the freezing rate prior to freeze-drying. Irwin Jr. 2,292,477, for example, states that the coffee may be frozen rapidly or slowly, the freezing rate not being important in the final product which is freeze-dried. Similarly, the Saunders patent (U.S. 2,853,796) indicates that slow-freezing of a natural juice or other liquid-containing substance is undesirable since the water of crystallization which is frozen, is not in a crystalline form and, therefore, the task of subsequently separating the water from the solids is more difficult.

When roasted coffee extract has been frozen and then freeze-dried according to the procedure of the above patents, a light, uncoffee-like color is obtained in the dried product. This color, whether it be a light brown, tan, or mustard-like color, is undesirable from an appearance standpoint.

It would, therefore, be highly desirable if a simple method were devised for controlling the color of freeze-dried coffee and, more particularly, if a simple method were devised whereby freeze-dried coffee could be made darker and more coffee-like in color and appearance.

This invention is founded on the discovery that a dark-colored freeze-dried coffee can be produced by a process which comprises cooling a water extract of coffee solids from 25° to 10° F. over a period of at least 10 minutes to thereby develop large crystals of water ice, further cooling said extract to below its eutectic point, and then freeze-drying said frozen extract.

It is a feature of this invention to cool the extract rapidly as it passes its ice point, preferably while seeding the liquid extract with particles of ice or frozen coffee extract. This will help to initiate proper ice crystal growth and thereby prevent supercooling of the extract and uncontrolled ice crystal formation. Agitation of the extract as it is cooled to below its ice point will also help to prevent supercooling and the consequent nucleation effect of forming many small ice crystals due to supercooling the coffee extract to below its ice point.

Thus, a most preferred technique for rapidly freezing the coffee extract while preserving a dark-color in the ultimate dried product is to cool the extract rapidly, with agitation, and seeding, as it passes the ice point. The extract is then held for at least 10 minutes somewhere in the temperature range of between 25° and 10° F. and then frozen rapidly again to below its eutectic point.

In the case of extract having a concentration of 15 to 30% soluble solids a critical portion of the cooling curve will be found in the range of 25° to 20° F. If extract is kept within this temperature range for at least 8 minutes, a dark-colored final product will be obtained.

In the case of 30 to 50% soluble solids extract, the critical portion of the cooling curve will be found between 20° and 15° F. Extract kept within this temperature range for at least 8 minutes during freezing will have a dark-color on drying.

As used in this application, "extract" means an aqueous extract of coffee solids having a concentration of between 15% and 50% soluble solids. At below 15% concentration, the cooling time of this invention will not achieve a dark-colored product while at concentrations of above 50% soluble solids, insufficient free water is present in the extract to appreciably effect the color of the final dried product. "Ice point" is that temperature at which water in the extract begins to crystallize into water ice. "Eutectic point" means that temperature at which a specific mixture of coffee solids, volatile aromatics and water having the lowest melting point of any other mixture in the extract, solidifies. In effect, this temperature is the lowest possible melting point of any material contained in the extract. "Product temperature," as used herein, means the temperature of the dried coffee extract. "Freeze-drying," as used in this context, refers to the process of drying whereby water is removed directly from the solid state to the vapor state without passing through an intermediate liquid state (sublimation). This process also includes that portion of the drying process wherein all of the water ice crystals have been sublimed and a eutectic mixture of coffee solids, aromatics and water is dried to a stable moisture content. In this portion of the freeze-drying process it is possible that some evaporation of water from the liquid state may occur without appreciable melting of the frozen extract. However, even at this stage of drying, the product temperature should be kept below the eutectic point of the material being dried in order to avoid melting any portion of the frozen coffee extract.

This invention will now be described by reference to several specific examples.

EXAMPLE 1

Coffee extract having a soluble solids level of 27% coffee solids was separated into two 75 ml. portions and placed in separate 3 inch aluminum foil molds having a thickness of about ½ inch. The extract at this point had a temperature of 65° F. One mold was immersed in liquid nitrogen (−327° F.) and found to freeze within a period of less than 1 minute. The second mold was placed in a constant temperature bath maintained at 10° F. and allowed to reach a temperature of 27° F. in a period of 2 minutes. The extract was agitated with a small propeller during the initial ice formation to accomplish uniform dispersion of ice crystals throughout the extract and prevent supercooling of the extract. Agitation was ceased when the temperature of the extract reached 25° F. The partially frozen extract was held for 20 minutes at between 20° and 25° F. and then placed in liquid nitrogen. The two samples were then freeze-dried at sublimation temperatures of below −13.5° F.

The sample which was held at between 20° and 25° F. for 20 minutes had a dark-brown color (similar to freshly roasted and ground coffee) while the sample frozen in liquid nitrogen had a light tan color. The freeze dried slabs were then ground to a particle size distribution approaching that of regular roasted and ground coffee. The color differences in the ground samples remained the same, the fast frozen particles having a light tan appearance while the slowly frozen product had an appearance similar to roasted and ground coffee.

EXAMPLE 2

The procedure of Example 1 was followed with the exception that the slowly frozen extract was seeded while being cooled to below its ice point. The extract was seeded with 0.2 grams of ice frost prepared by allowing moisture from the air to form on a chilled metal plate. Seeding was accomplished while the extract was being cooled to below its ice point with agitation and while the extract was still in a substantially liquid state, the temperature of the extract being about 25°–28° F. The small ice crystals dispersed uniformly throughout the extract due to the agitation and were found to suppress spontaneous nucleation and supercooling of the coffee extract. The partially frozen extract was held for about 10 minutes at between 23° and 20° F. while agitation was continued and then frozen in liquid nitrogen. The two samples was then freeze-dried at sublimation temperatures of below −13.5° F. The slowly frozen product was found to be uniformly dark brown in color and identical in all respects to the slow frozen product of Example 1 while the fast frozen product was a light tan color.

EXAMPLE 3

The procedure of Example 2 was followed with the exception that no agitation was employed as the extract was seeded. The slowly frozen sample was seeded upon being cooled to a temperature just below 28° F. (the ice point). Seeding was discontinued at 25° F. and the extract was then held at between 25° and 20° F. for 15 minutes. The slushed extract was then frozen in liquid nitrogen and dried. The slowly-frozen product and the fast frozen product had the same color differences which were found in the products of Examples 1 and 2. The color differences in the two products persisted upon grinding the extract to a particle size distribution similar to that of regular roasted and ground coffee.

While this invention has been described by reference to specific examples, it is understood to be limited only by the scope of the appended claims.

What is claimed is:

1. A process for producing a dark-colored freeze-dried coffee which comprises forming an extract of coffee solids having a concentration of 15 to 30% soluble solids, cooling said extract from 25° to 20° F. over a period of at least 8 minutes to develop large crystals of water ice, further cooling said extract at a rapid rate to below its eutectic point, and freeze-drying said frozen extract.

2. A process for producing a dark-colored freeze-dried coffee which comprises forming an extract of coffee solids having a concentration of 15 to 30% soluble solids, cooling said extract rapidly to below its ice point with agitation to thereby form discrete ice crystals, holding said extract at between 25° and 20° F. for at least 8 minutes to develop large ice crystals in said extract, further rapidly cooling said extract to below its eutectic point, and freeze-drying said frozen extract.

3. A process for producing a dark-colored freeze-dried coffee which comprises forming an extract of coffee solids having a concentration of 15 to 30% soluble solids, cooling said extract rapidly to below its ice point while seeding said extract to thereby form discrete ice crystals, holding said extract at between 25° and 20° F. for at least 8 minutes to develop large ice crystals in said extract, further rapidly cooling said extract to below its eutectic point, and freeze-drying said frozen extract.

4. A process for producing a dark-colored freeze-dried coffee which comprises forming an extract of coffee solids having a concentration of 15 to 30% soluble solids, cooling said extract rapidly to below its ice point while seeding and agitating said extract to thereby form discrete ice crystals, holding said extract at between 25° and 20° F. for at least 8 minutes to develop large ice crystals in said extract, further rapidly cooling said extract to below its eutectic point, and freeze-drying said frozen extract.

5. A process for producing a dark-colored freeze-dried coffee which comprises forming an extract of coffee solids having a concentration of 30 to 50% soluble solids, cooling said extract from 20° F. to 15° F. over a period of at least 8 minutes to thereby develop large crystals of water ice, further cooling said extract at a rapid rate to below its eutectic point, and freeze-drying said frozen extract.

6. A process for producing a dark-colored freeze-dried coffee which comprises forming an extract of coffee solids having a concentration of 30 to 50% soluble solids, cooling said extract rapidly to below its ice point while agitating said extract to thereby form discrete ice crystals, holding said extract at between 20° F. and 15° F. for at least 8 minutes to develop large ice crystals in said extract, further rapidly cooling said extract to below its eutectic point, and freeze-drying said frozen extract.

7. A process for producing a dark-colored freeze-dried coffee which comprises forming an extract of coffee solids having a concentration of 30 to 50% soluble solids, cooling said extract rapidly to below its ice point while seeding said extract to thereby form discrete ice crystals, holding said extract at between 20° F. and 15° F. for at least 8 minutes to develop large ice crystals in said extract, further rapidly cooling said extract to below its eutectic point, and freeze-drying said frozen extract.

8. A process for producing a dark-colored freeze-dried coffee which comprises forming an extract of coffee solids having a concentration of 30 to 50% soluble solids, cooling said extract rapidly to below its ice point while agitating and seeding said extract to thereby form discrete ice crystals, holding said extract at between 20° F. and 15° F. for at least 8 minutes to develop large ice crystals in said extract, further rapidly cooling said extract to below its eutectic point, and freeze-drying said frozen extract.

References Cited

UNITED STATES PATENTS

| | | | |
|---|---|---|---|
| 2,292,447 | 8/1942 | Irwin | 99—199 |
| 2,431,496 | 11/1947 | Natelson et al. | 99—71 |
| 3,244,529 | 4/1966 | Johnson et al. | 99—71 |
| 3,244,533 | 4/1966 | Clinton et al. | 99—71 |

MAURICE W. GREENSTEIN, *Primary Examiner.*

U.S. Cl. X.R.

99—199; 34—5